United States Patent
Ito et al.

(10) Patent No.: US 9,172,866 B2
(45) Date of Patent: Oct. 27, 2015

(54) ELECTRONIC DEVICE, DRIVING METHOD OF THE SAME, AND COMPUTER READABLE RECORDING MEDIUM

(71) Applicant: Olympus Imaging Corp., Shibuya-ku, Tokyo (JP)

(72) Inventors: Kensei Ito, Sagamihara (JP); Kazuhiro Sato, Sagamihara (JP); Mariko Ushio, Hachioji (JP); Naoki Fujii, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 118 days.

(21) Appl. No.: 14/050,609

(22) Filed: Oct. 10, 2013

(65) Prior Publication Data
US 2014/0098273 A1     Apr. 10, 2014

(30) Foreign Application Priority Data

Oct. 10, 2012 (JP) .................................. 2012-225399

(51) Int. Cl.
*H04N 5/232* (2006.01)

(52) U.S. Cl.
CPC .................................. *H04N 5/23216* (2013.01)

(58) Field of Classification Search
CPC .......... H04N 5/23293; H04N 1/00411; H04N 1/00408; H04N 1/00416; H04N 5/23216; G03B 13/02; G03B 17/20; G03B 17/00; G09G 1/165
See application file for complete search history.

(56) References Cited

U.S. PATENT DOCUMENTS

| | | | |
|---|---|---|---|
| 2006/0022961 A1* | 2/2006 | Kaminaga | 345/173 |
| 2006/0026536 A1* | 2/2006 | Hotelling et al. | 715/863 |
| 2006/0044285 A1* | 3/2006 | Sato et al. | 345/173 |
| 2008/0303935 A1* | 12/2008 | Misawa | 348/333.01 |
| 2010/0073303 A1* | 3/2010 | Wu et al. | 345/173 |
| 2010/0099465 A1* | 4/2010 | Kim et al. | 455/566 |
| 2010/0130250 A1* | 5/2010 | Choi | 455/556.1 |
| 2010/0208107 A1* | 8/2010 | Nonaka et al. | 348/240.99 |
| 2010/0245277 A1* | 9/2010 | Nakao | 345/173 |
| 2010/0289768 A1* | 11/2010 | Nakao | 345/173 |
| 2011/0019058 A1* | 1/2011 | Sakai et al. | 348/333.01 |
| 2011/0037712 A1* | 2/2011 | Kim et al. | 345/173 |
| 2011/0109581 A1* | 5/2011 | Ozawa et al. | 345/173 |
| 2011/0221949 A1* | 9/2011 | Nonaka et al. | 348/333.02 |
| 2011/0267526 A1* | 11/2011 | Ishihara et al. | 348/333.01 |
| 2011/0267530 A1* | 11/2011 | Chun | 348/333.11 |
| 2012/0220264 A1* | 8/2012 | Kawabata | 455/411 |
| 2013/0141362 A1* | 6/2013 | Asanuma | 345/173 |

(Continued)

FOREIGN PATENT DOCUMENTS

JP      2010-232911       10/2010

*Primary Examiner* — Aung S Moe
(74) *Attorney, Agent, or Firm* — John C. Pokotylo; Straub & Pokotylo

(57) ABSTRACT

An electronic device includes: a display unit capable of displaying a rotational pathway which rotates on a screen and with which an operation of the electronic device is associated according to a position on the rotational pathway; a touch screen that detects a touch from an outside and receives an input of a positional signal according to a position of the touch; a display controller that converts the position of the touch corresponding to the positional signal received by the touch screen into a position on the rotational pathway and causes a mark to be displayed at the position converted; and an operation controller that controls an operation of the electronic device according to a display position of the mark on the rotational pathway.

15 Claims, 15 Drawing Sheets

(56) References Cited

U.S. PATENT DOCUMENTS

2013/0141624 A1* 6/2013 Tomizawa et al. ....... 348/333.02
2014/0024891 A1* 1/2014 Motoki ........................ 600/103
2014/0049677 A1* 2/2014 Kawaguchi ............. 348/333.01
2014/0176773 A1* 6/2014 Sakuma et al. .......... 348/333.02
2014/0267869 A1* 9/2014 Sawa ....................... 348/333.03
2014/0368719 A1* 12/2014 Kaneko et al. ........... 348/333.02
2015/0002701 A1* 1/2015 Mayuzumi ................... 348/239

* cited by examiner

ELECTRONIC DEVICE, DRIVING METHOD OF THE SAME, AND COMPUTER READABLE RECORDING MEDIUM

CROSS-REFERENCE TO RELATED APPLICATIONS

This application is based upon and claims the benefit of priority from Japanese Patent Application No. 2012-225399, filed on Oct. 10, 2012, the entire contents of which are incorporated herein by reference.

BACKGROUND OF THE INVENTION

1. Field of the Invention

The present invention relates to an electronic device provided with a touch screen, a driving method of the electronic device, and a recording medium.

2. Description of the Related Art

In recent years, a technique of receiving inputs of operations related to shooting by a touch screen provided on a display screen of a display unit that displays images in an imaging device such as a digital camera has been known (see Japanese Patent Application Laid-Open No. 2010-232911, for example). In this technique, a concave shaped guide part that guides a touch operation is provided in a right region of a touch screen at a gripping end for gripping the imaging device with a right hand. Thereby, it is possible to perform operations related to shooting by touch operations even if a user is not able to check a display unit while the user's eye is kept close to a finder.

SUMMARY OF THE INVENTION

According to an aspect of the present invention, an electronic device capable of operating according to an operation signal that is input, includes: a display unit capable of displaying a rotational pathway which rotates on a screen and with which an operation of the electronic device is associated according to a position on the rotational pathway; a touch screen that detects a touch from an outside and receives an input of a positional signal according to a position of the touch; a display controller that converts the position of the touch corresponding to the positional signal received by the touch screen into a position on the rotational pathway and causes a mark to be displayed at the position converted; and an operation controller that controls an operation of the electronic device according to a display position of the mark on the rotational pathway.

According to another aspect of the present invention, a driving method executed by an electronic device having a touch screen that detects a touch from an outside and receives an input of a positional signal corresponding to a position of the touch, the electronic device being capable of operating according to an operation signal that is input, and the driving method includes: starting display of a rotational pathway that rotates on a screen and with which an operation of the electronic device is associated according to a position on the rotational pathway; converting the position of the touch corresponding to the positional signal received by the touch screen into a position on the rotational pathway and causing a mark to be displayed at the position converted; and controlling an operation of the electronic device according to a display position of the mark on the rotational pathway when a determination signal that determines the display position of the mark is input.

According to still another aspect of the present invention, a non-transitory computer readable recording medium has an executable computer program recorded therein, and the computer program instructs a processor, which is included in an electronic device comprising a touch screen that detects a touch from an outside, receives an input of a positional signal corresponding to a position of the touch, and is capable of operating according to an operation signal that is input, to execute: starting display of a rotational pathway that rotates on a screen and with which an operation of the electronic device is associated according to a position on the rotational pathway; converting the position of the touch corresponding to the positional signal received by the touch screen into a position on the rotational pathway and causing a mark to be displayed at the position converted; and controlling an operation of the electronic device according to a display position of the mark on the rotational pathway when a determination signal that determines the display position of the mark is input.

The above and other features, advantages, and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
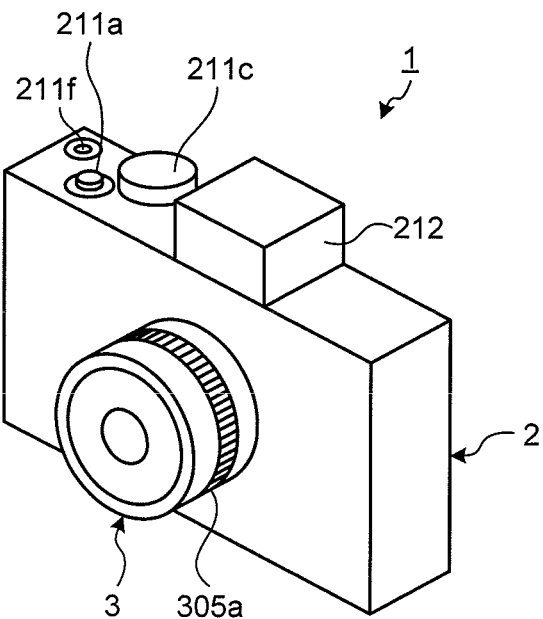
FIG. 1 shows a configuration of an imaging device, at a side facing a subject, according to a first embodiment of the present invention.
Figure 2:
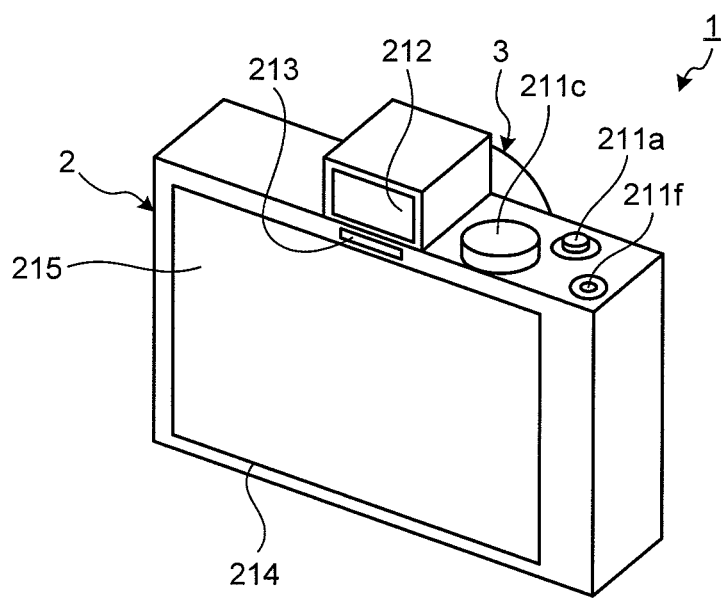
FIG. 2 shows a configuration of the imaging device, at a side facing a user, according to the first embodiment of the present invention.
Figure 3:
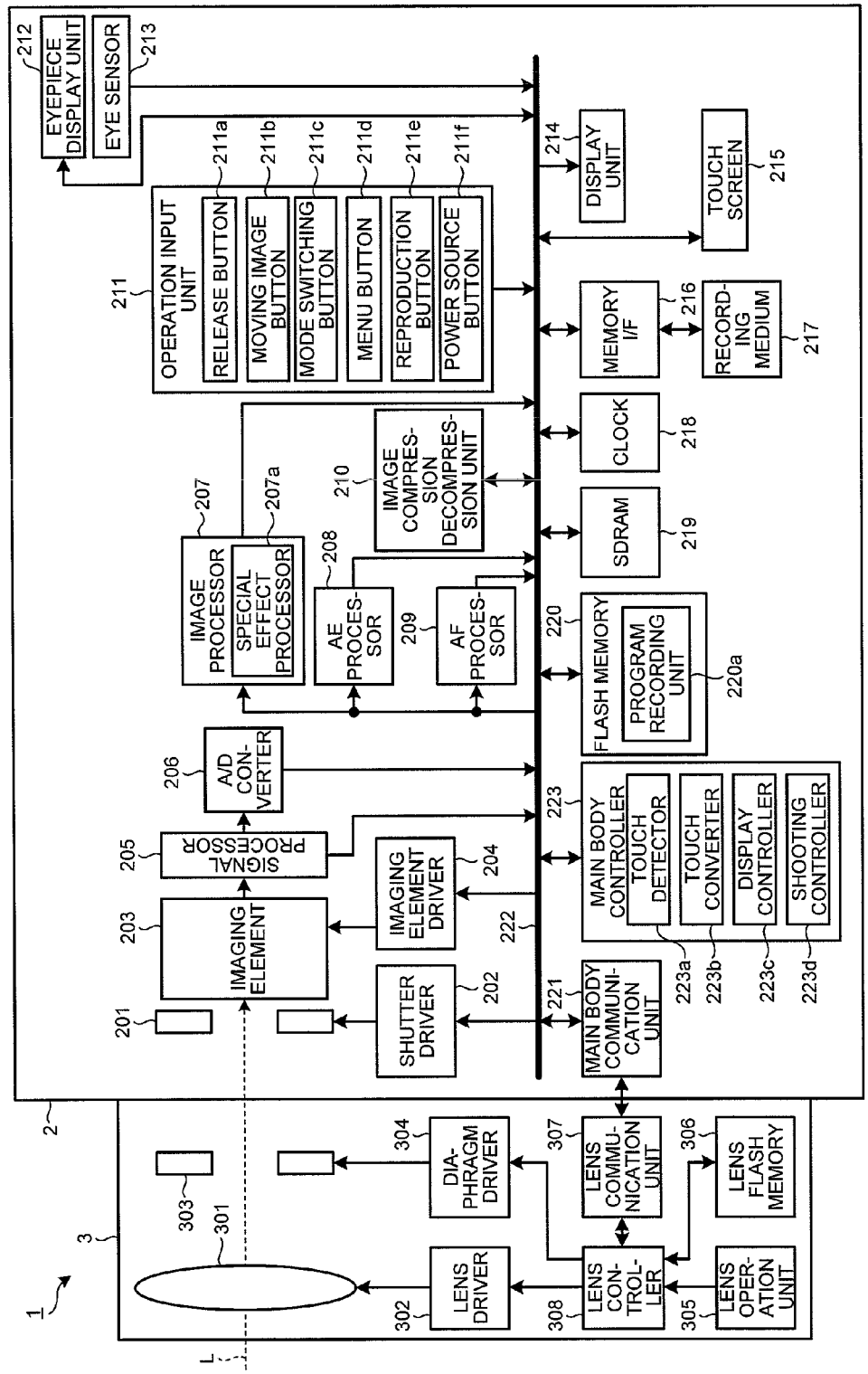
FIG. 3 is a block diagram of a functional configuration of the imaging device according to the first embodiment of the present invention.

Exemplary embodiments of an electronic device according to the present invention (hereinafter referred to as "embodiments") will be explained in detail below with reference to the accompanying drawings by taking an imaging device as an example. The same part will be assigned with the same reference symbol in the explanation below. It should be noted that the present invention is not limited to the embodiments.
First Embodiment FIG. 1 shows a configuration of an imaging device, at a side facing a subject (a front surface side), according to a first embodiment of the present invention. FIG. 2 shows a configuration of the imaging device, at a side facing a user (a rear surface side), according to the first embodiment of the present invention. FIG. 3 is a block diagram of a functional configuration of the imaging device according to the first embodiment of the present invention.

An imaging device 1 shown in FIGS. 1 to 3 is provided with a main body unit 2 and a lens unit 3 that is detachably attached to the main body unit 2, condenses a light from a predetermined field of view, and is capable of an optical zoom.

First, the main body unit 2 will be explained. The main body unit 2 is provided with a shutter 201, a shutter driver 202, an imaging element 203, an imaging element driver 204, a signal processor 205, an A/D converter 206, an image processor 207, an AE processor 208, an AF processor 209, an image compression decompression unit 210, an operation input unit 211, an eyepiece display unit 212, an eye sensor 213, a display unit 214, a touch screen 215, a memory I/F 216, a recording medium 217, a clock 218, a synchronous dynamic random access memory (SDRAM) 219, a flash memory 220, a main body communication unit 221, a bus 222, and a main body controller 223.

The shutter 201 sets a state of the imaging element 203 to a light exposure state or a light shielding state. The shutter driver 202 is configured by using a stepper motor, a DC motor, and the like and drives the shutter 201 in response to an instruction signal input from the main body controller 223.

The imaging element 203 is configured by using a charge coupled device (CCD), a complementary metal oxide semiconductor (CMOS), and the like which receive and convert into an electric signal a light condensed by the lens unit 3, and generates image data of the subject. The imaging element driver 204 makes image data (analogue signal) output from the imaging element 203 to the signal processor 205 at a predetermined time. In this sense, the imaging element driver 204 functions as an electronic shutter.

The signal processor 205 executes an analogue process on the image data input from the imaging element 203 and outputs it to the A/D converter 206. For example, the signal processor 205 executes, after executing a reduction of a reset noise and the like, a waveform shaping and a gain-up to obtain an intended brightness on the image data.

By executing an A/D conversion on the analogue image data input from the signal processor 205, the A/D converter 206 generates and outputs to the SDRAM 219 via the bus 222 digital image data (raw data).

The image processor 207 obtains image data (raw data) from the SDRAM 219 via the bus 222 and generates image data through image processes of various types on the obtained image data image. Specifically, the image processor 207 executes basic image processes including an optical black subtraction process, a white balance (WB) adjustment process, a color matrix computing process, a gamma correction process, a color reproduction process, an edge emphasis process, and the like on the image data based on parameters for image processes set in advance. The image processor 207 executes a synchronization process of image data in a case where the imaging element 203 has a Bayer pattern. Here, the parameters for image processes mean values for contrast, sharpness, intensity, white balance, and gradation. The image processor 207 outputs the image data on which image processes are executed to any one of the eyepiece display unit 212, the display unit 214, and the SDRAM 219 via the bus 222. The image processor 207 is provided with a special effect processor 207a.

The special effect processor 207a executes a special effect image process which produces a visual effect in combination with a plurality of image processes on one piece of image data to generate processed image data. Specifically, the special effect processor 207a generates processed image data in combination with image processes including a tone curve process, a feathering process, an alpha blending process, an image composition process, an intensity emphasis process, a contrast emphasis process, a shading process, a white edge process, a low-pass filter process, a white balance process, a hue conversion process, an edge emphasis process, a level correction optimizing process, a noise pattern superimposing process, and a composition process.

The AE processor 208 obtains image data recorded in the SDRAM 219 via the bus 222 and sets exposure conditions in executing a still image shooting or a moving image shooting in the imaging device 1 based on the obtained image data. Specifically, the AE processor 208 executes an automatic exposure of the imaging device 1 by calculating a luminance from the image data and determining an aperture value, a shutter speed, ISO sensitivity, and the like, for example, based on the calculated luminance.

The AF processor 209 obtains image data recorded in the SDRAM 219 via the bus 222 and executes an adjustment of an autofocus of the imaging device 1 based on the obtained image data. For example, the AF processor 209 executes the autofocus adjustment of the imaging device 1 by taking out a signal of high frequency component from the image data, executing an automatic focus (AF) computing process on the signal of the high frequency component, and thereby determining a full-focus evaluation of the imaging device 1. The AF processor 209 may execute the autofocus adjustment of the imaging device 1 by using a pupil division type phase difference detection method.

The image compression decompression unit 210 obtains image data and processed image data from the SDRAM 219 via the bus 222, compresses the obtained image data in accordance with a predetermined format, and outputs the compressed image data to the recording medium 217 via the memory I/F 216. Here, the predetermined format may be the joint photographic experts group (JPEG) system, the motion JPEG system, the MP4 (H.264) system, and the like. Besides, the image compression decompression unit 210 obtains the image data (compressed image data) recorded in the recording medium 217 via the bus 222 and the memory I/F 216, and decompresses (expands) and outputs to the SDRAM 219 the obtained image data.

The operation input unit 211 is provided with a release button 211a that accepts an input of a release signal instructing a shooting of a still image, a moving image button 211b that accepts an input of a moving image release signal instructing a shooting of a moving image, a mode switching button 211c that accepts an input of a signal instructing a mode switching in the imaging device 1, a menu button 211d that switches settings of various kinds of the imaging device 1, a reproduction button 211e that accepts an input of a signal instructing a reproduction of the image data recorded in the recording medium 217, and a power source button 211f that switches a power state of the imaging device 1 between ON state and OFF state. The release button 211a can move back and forth by an external depression and accepts an input of a second release signal instructing a shooting of a still image when fully depressed while accepting an input of a first release signal instructing a preparation operation for shooting when depressed halfway.

The eyepiece display unit 212 displays an image corresponding to the image data or the processed image data recorded in the SDRAM 219 via the bus 222, or an image corresponding to the image data recorded in the recording medium 217 under the control of the main body controller 223. In this sense, the eyepiece display unit 212 functions as an electronic view finder (EVF) of eyepiece type. The eyepiece display unit 212 is configured by using a display panel constituted by a liquid crystal or an organic electro luminescence (EL), a driver, and the like. Besides, the eyepiece display unit 212 displays a rotational pathway which rotates within a screen and with which an operation of the imaging device 1 is associated depending on a position on the rotational pathway. The rotational pathway has a ring shape and is associated, for the operations of the imaging device 1, with shooting parameters concerning shooting. Here, the shooting parameters mean exposure information concerning shooting, brightness information, zoom magnification information, focus position information, ISO sensitivity information, aperture information, shutter speed information, process information of the image process by the image processor 207, and shooting mode information concerning shooting modes.

The eye sensor 213 is provided in the vicinity of the eyepiece display unit 212 (see FIG. 2) and detects whether or not a human eye comes close to the eyepiece display unit 212. Specifically, the eye sensor 213 detects whether or not a user is checking an image by the eyepiece display unit 212 and outputs a result of the detection to the main body controller 223.

The display unit 214 is configured by using a display panel constituted by a liquid crystal or an organic EL and displays an image corresponding to the image data recorded in the SDRAM 219 via the bus 222 or an image corresponding to the image data recorded in the recording medium 217 under the control of the main body controller 223. Here, the image display includes a rec view display in which image data right after the shooting is displayed for a predetermined period of time (three seconds, for example); a reproduction display in which image data recorded in the recording medium 217 is reproduced; a live view display in which live view images corresponding to image data continuously generated by the imaging element 203 are sequentially displayed in chronological order; and the like. The display unit 214 arbitrarily displays operational information of the imaging device 1 and information concerning the shooting. The display unit 214 functions as a rear surface display unit in the first embodiment.

The touch screen 215 is provided, by being superimposed, on a display screen of the display unit 214. The touch screen 215 detects a position of a touch by an external object and outputs to the main body controller 223 a positional signal depending on the detected touch position. Besides, the touch screen 215 may detect a position touched by a user based on information, for example, an icon image and a thumbnail image, displayed in the display unit 214 and accept an input of an instruction signal for instructing an operation to be executed by the imaging device 1 depending on the detected touch position and a selection signal for selecting an image. In general, a resistance film system, an electrostatic capacitance system, an optical system, and the like are adopted for the touch screen 215. In the first embodiment, a touch screen of any system can be applied.

The recording medium 217 is configured by using a memory card and the like attached from an outside of the imaging device 1. The recording medium 217 is detachably attached to the imaging device 1 via the memory I/F 216. Image data on which the image processor 207 and the image compression decompression unit 210 have executed processes is written in the recording medium 217.

The clock 218 has a function as a time keeper and a function of determining a shooting day and time. The clock 218 outputs day and time data to the main body controller 223 to add the day and time data to the image data generated by the imaging element 203.

The SDRAM 219 is configured by using a volatile memory and temporarily records the image data input from the A/D converter 206 via the bus 222, the image data input from the image processor 207, and information in process in the imaging device 1. For example, the SDRAM 219 temporarily records image data sequentially output for each frame by the imaging element 203 via the signal processor 205, the A/D converter 206, and the bus 222.

The flash memory 220 is provided with a program recording unit 220a. The program recording unit 220a records programs of various types for operating the imaging device 1, data of various types used during an execution of programs, image process parameters necessary for the operation of image processes by the image processor 207, and the like. The flash memory 220 is configured by using a non-volatile memory.

The main body communication unit 221 is a communication interface that allows a communication with the lens unit 3 connected to the main body unit 2.

The bus 222 is configured by using a transmission channel and the like connecting components of the imaging device 1. The bus 222 transmits data of various types generated in the inside of the imaging device 1 to each component of the imaging device 1.

The main body controller 223 is configured by using a central processing unit (CPU) and the like and executes a transmission of instructions appropriate to components constituting the imaging device 1 and data depending on the instruction signal from the operation input unit 211 and the positional signal from the touch screen 215 to overall control the operation of the imaging device 1.

A detailed configuration of the main body controller 223 will be explained. The main body controller 223 is provided with a touch detector 223a, a touch converter 223b, a display controller 223c, and a shooting controller 223d.

The touch detector 223a detects, depending on a positional signal input from the touch screen 215, a touch position where a user touches on the touch screen 215.

The touch converter 223b converts the touch position detected by the touch detector 223a into a position at the rotational pathway on a live view image displayed in the eyepiece display unit 212.

The display controller 223c converts a contact position corresponding to the positional signal whose input is accepted by the touch screen 215 into a position at the rotational pathway displayed in the eyepiece display unit 212 or the display unit 214 and controls to display a mark at the converted position. Specifically, the display controller 223c controls the display unit 214 or the eyepiece display unit 212 to display a mark at a display position, obtained through the conversion by the touch converter 223b, of the rotational pathway. The display controller 223c controls to display a mark at a predetermined position on the rotational pathway when the touch screen 215 accepts an input of a positional signal.

The shooting controller 223d controls a driving of the imaging device 1 based on the instruction signal input from the operation input unit 211 or the positional signal input from the touch screen 215. The shooting controller 223d executes a control of starting a still image shooting operation in the imaging device 1 when a second release signal is input from the release button 211a. Here, the still image shooting operation in the imaging device 1 means an operation in which the signal processor 205 and the image processor 207 execute predetermined processes on image data output by the imaging element 203 in response to the driving of the shutter driver 202 and the imaging element driver 204. The image data on which the processes are executed in this manner is compressed by the image compression decompression unit 210 in accordance with a predetermined format and recorded in the recording medium 217 via the bus 222 and the memory I/F 216. The shooting controller 223d controls the operation of the imaging device 1 depending on the position where the mark is displayed on the rotational pathway displayed in the eyepiece display unit 212 or the display unit 214. Specifically, the shooting controller 223d causes execution of the operation of the imaging device 1, the operation corresponding to the display position of the mark on the rotational pathway at a time point when a determination signal determining the operation of the imaging device 1 is input from the operation input unit 211, the operation being, for example, shooting at an exposure value. In the first embodiment, the shooting controller 223d functions as an operation controller.

The main body unit 2 having the configuration explained above may further be provided with an audio input/output unit, an auxiliary light emitter that emits an auxiliary light (flash) to a subject, a communication unit that has a function of executing a bidirectional transmission with an external device via the Internet, and the like.

A configuration of the lens unit 3 will be explained next. The lens unit 3 is provided with an optical system 301, a lens driver 302, a diaphragm 303, a diaphragm driver 304, a lens operation unit 305, a lens flash memory 306, a lens communication unit 307, and a lens controller 308.

The optical system 301 condenses a light from a predetermined field of view area. The optical system 301 is configured by using a plurality of lenses. The optical system 301 has an optical zoom function of changing a focal point distance and a focusing function of changing a focal point. The lens driver 302 changes a point of focus, a focal point distance, and the like of the optical system 301 by shifting the optical system 301 on and along an optical axis L. The lens driver 302 is configured by using a DC motor, a stepper motor, and the like.

The diaphragm 303 limits an amount of an incident light condensed by the optical system 301 to adjust the exposure. The diaphragm driver 304 is configured by using a stepper motor and the like and drives the diaphragm 303.

The lens operation unit 305, which is a ring provided around a lens barrel of the lens unit 3, accepts an input of an instruction signal for starting an operation of an optical zoom in the lens unit 3 or an input of an instruction signal for instructing an adjustment of a point of focus or a change of a focal point distance in the lens unit 3. The lens operation unit 305 may be realized by a touch-tone button, a lever type button capable of switching ON and OFF, and the like.

The lens flash memory 306 records a control program for determining a position and a movement of the optical system 301 and lens characteristics and parameters of various types of the optical system 301.

The lens communication unit 307 is a communication interface for executing a communication with the main body communication unit 221 of the main body unit 2 when the lens unit 3 is attached to the main body unit 2.

The lens controller 308 is configured by using a CPU and the like and controls the operation of the lens unit 3 in response to an instruction signal input from the lens operation unit 305 or an instruction signal input from the main body unit 2. Specifically, the lens controller 308 drives the lens driver 302 to bring the lens unit 3 into focus in response to the instruction signal input from main body controller 223. Besides, the lens controller 308 drives the diaphragm driver 304 to change an aperture value of the diaphragm 303 in response to the instruction signal input from the lens operation unit 305. In addition, the lens controller 308 transmits, to the main body unit 2 via the lens communication unit 307 and the main body communication unit 221, information of a point of focus of the lens unit 3, focal point distance information, brightness information (f value), and unique information that allows identifying the lens unit 3 when the lens unit 3 is attached to the main body unit 2.

Figure 4:
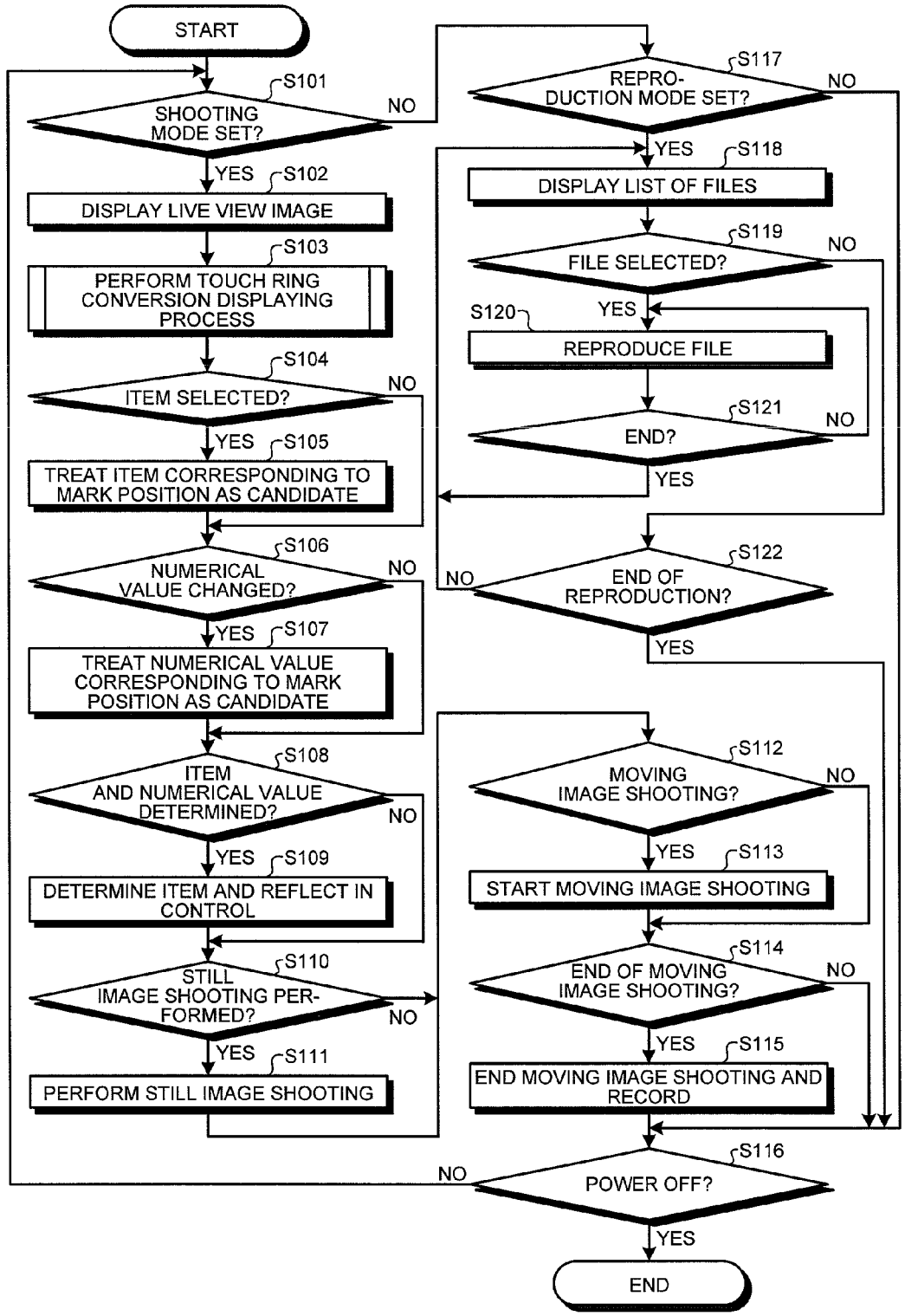
FIG. 4 is a flowchart of an outline of a process executed by the imaging device according to the first embodiment of the present invention.

An outline of a process executed by the imaging device 1 having the configuration explained above will be explained. FIG. 4 is a flowchart of an outline of a process executed by the imaging device 1.

As shown in FIG. 4, when a shooting mode is set in the imaging device 1 ("Yes" at step S101), the display controller 223c controls the display unit 214 or the eyepiece display unit 212 to display a live view image corresponding to image data that the imaging element 203 continuously generates (step S102). In this case, a user executes a shooting while looking at the live view image displayed in the eyepiece display unit 212 or the display unit 214.

Figure 5:
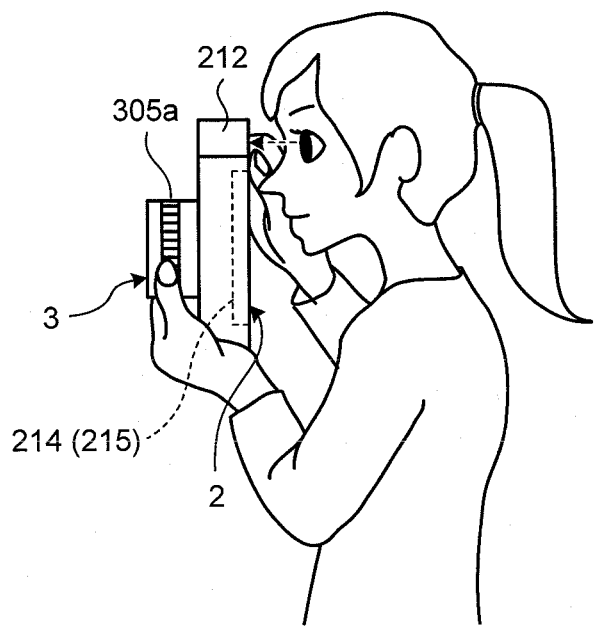
FIG. 5 shows a state where a user executes a shooting while checking a live view image in an eyepiece display unit in the imaging device according to the first embodiment of the present invention.
Figure 6:
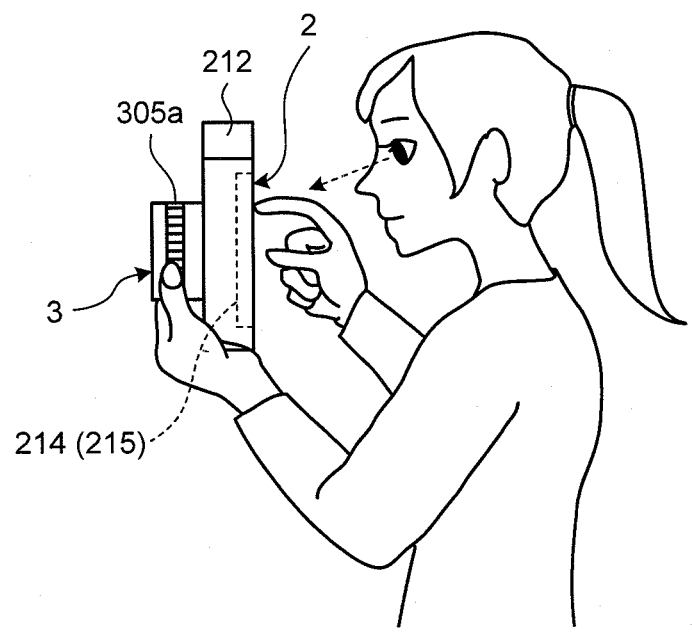
FIG. 6 shows a state where a user executes a shooting while checking a live view image in a display unit in the imaging device according to the first embodiment of the present invention.

FIG. 5 shows a state where a user executes a shooting while checking a live view image in the eyepiece display unit 212. FIG. 6 shows a state where a user executes a shooting while checking a live view image in the display unit 214.

In executing a shooting while checking the live view image displayed in the eyepiece display unit 212 as shown in FIG. 5, the user is not able to look at the display unit 214. Therefore the user is, though not being able to change shooting parameters of the imaging device 1 via the touch screen 215, is able to move a finger on the touch screen 215 in such a way as to smoothly draw a circle relatively in the vertical direction and the horizontal direction. In contrast to this, in executing a shooting while checking the live view image displayed in the display unit 214 as shown in FIG. 6, the user has, though being able to easily select shooting parameters in the imaging device 1, a desired subject, and a shooting mode and perform a setting for an image process to be performed by the image processor 207 via the touch screen 215, difficulty in checking an accurate color of the subject and a state of the focus in the live view image displayed in the display unit 214 due to an influence of an outside light. Moreover, the user has difficulty in grasping the imaging device 1 with one hand when a lens barrel of the lens unit 3 becomes long as a result of the focal point distance of the lens unit 3's becoming long.

After step S102, in changing shooting parameters of the imaging device 1 via the touch screen in the case where the user executes a shooting in the eyepiece display unit 212, the imaging device 1 displays, by superimposing on the live view image displayed in the eyepiece display unit 212, a ring as a rotational pathway with which operations of the imaging device 1 are associated, and executes a touch ring conversion displaying process in which shooting parameters are changed in response to a touch operation onto the touch screen 215 (step S103).

Figure 7:
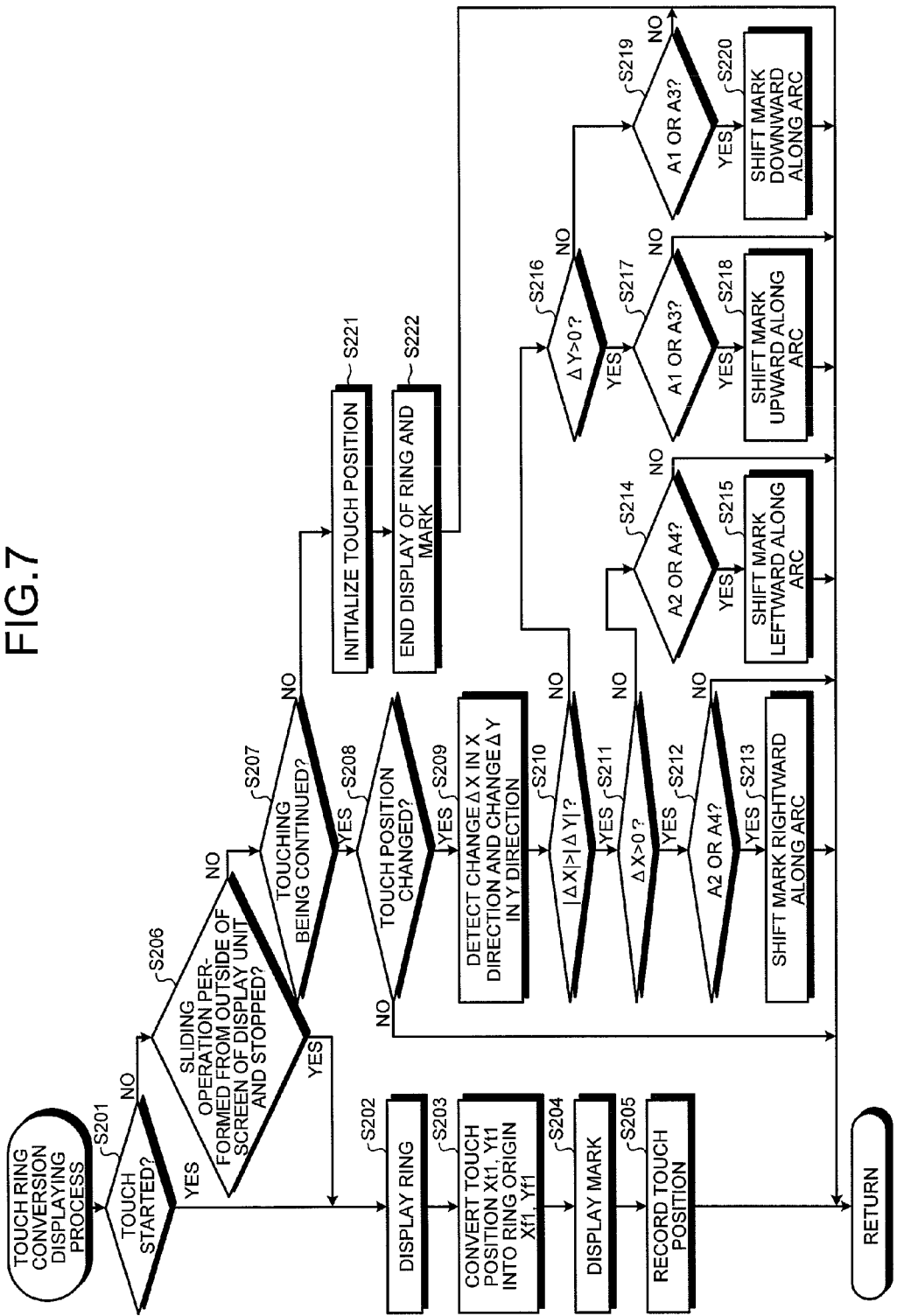
FIG. 7 is a flowchart of an outline of the touch ring conversion displaying process in FIG. 4.

FIG. 7 is a flowchart of an outline of the touch ring conversion displaying process at step S103.

As shown in FIG. 7, when a touch onto the touch screen 215 is started ("Yes" at step S201), the display controller 223c displays, by superimposing on the live view image displayed in the eyepiece display unit 212, a ring as a rotational pathway in which a plurality of operation contents of the imaging device 1 are arranged at predetermined intervals (step S202).

The touch converter 223b then converts a touch position Xt1, Yt1, detected by the touch detector 223a depending on a positional signal input from the touch screen 215, on the touch screen 215 into a ring origin Xf1, Yf1 displayed by being superimposed on the live view image in the eyepiece display unit 212 (step S203).

Figure 8:
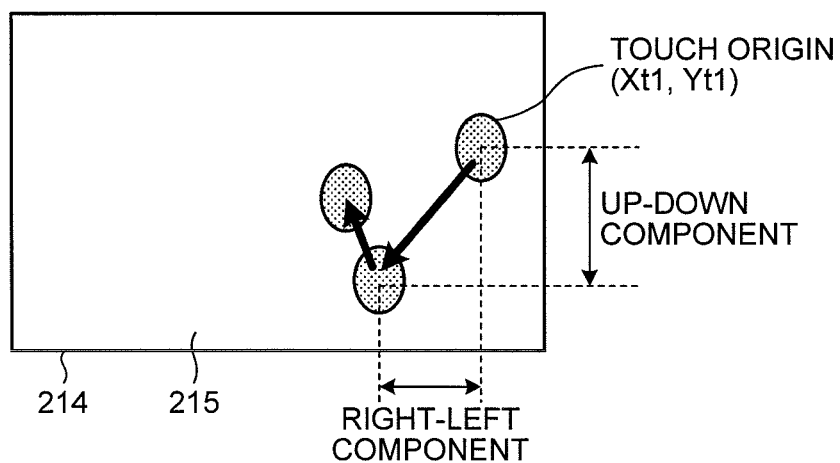
FIG. 8 schematically shows a touch position on a touch screen in the imaging device according to the first embodiment of the present invention.
Figure 9:
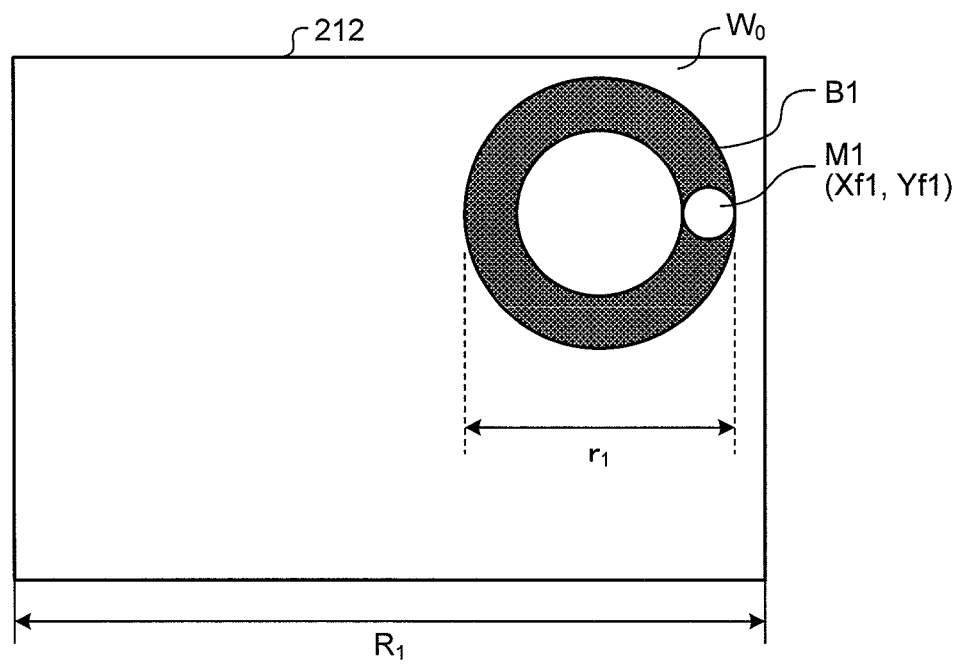
FIG. 9 schematically shows operational information displayed in the eyepiece display unit of the imaging device according to the first embodiment of the present invention.

FIG. 8 schematically shows a touch position on the touch screen 215. FIG. 9 schematically shows the ring as a rotational pathway displayed in the eyepiece display unit 212. In FIGS. 8 and 9, the horizontal direction is set as X and the vertical direction is set as Y.

As shown in FIGS. 8 and 9, the touch converter 223b executes a conversion of the touch position Xt1, Yt1, detected by the touch detector 223a depending on the positional signal input from the touch screen 215, on the touch screen 215 so that a predetermined position, for example the origin Xf1, Yf1 at the right endpoint, in a ring B1 as the rotational pathway displayed by being superimposed on a live view image $W_0$ in the eyepiece display unit 212 is treated as an initial position in the ring B1. The display controller 223c controls the eyepiece display unit 212 to display a mark at the initial position converted by the touch converter 223b. On this occasion, the display controller 223c controls the eyepiece display unit 212 to make the display so that a display area of the ring B1 is approximately one fourth of the display area of the eyepiece display unit 212. Specifically, the display controller 223c controls the eyepiece display unit 212 to make the display so that a diameter $r_1$ of the ring B1 becomes approximately one fourth of a length R1 in the horizontal direction of the display screen of the eyepiece display unit 212. While the right endpoint is the origin of a touch position in FIG. 9, a left endpoint, an upper endpoint, or a lower endpoint may be the origin and an origin of a mark M1 may be changed depending on the touch position on the touch screen 215. Moreover, the rotational pathway may not necessarily be a ring and may be a polygonal shape including a triangle, a quadrangle, and the like.

After that, the display controller 223c superimposes the mark M1 on the origin Xf1, Yf1 of the ring B1 converted by the touch converter 223b and controls the eyepiece display unit 212 to make the display (step S204).

The touch detector 223a then records the touch position detected by the touch detector 223a on the touch screen 215 in the SDRAM 219 (step S205). After step S205, the imaging device 1 returns to the main routine in FIG. 4.

When a touch onto the touch screen 215 is not started at step S201 ("No" at step S201), and a sliding operation is executed from an outside of the screen of the display unit 214 and stopped ("Yes" at step S206), the imaging device 1 moves to step S202. In contrast to this, when a touch onto the touch screen 215 is not started ("No" at step S201), and a sliding operation is executed from an outside of the screen of the display unit 214 and not stopped ("No" at step S206), the imaging device 1 moves to step S207.

When the touch onto the touch screen 215 by the user is continued at step S207 ("Yes" at step S207) and the touch position changes ("Yes" at step S208), the touch detector 223a detects a change $\Delta X$ in the X direction and a change $\Delta Y$ in the Y direction based on the positional signal input from the touch screen 215 (step S209). Specifically, the touch detector 223a detects the change $\Delta X$ in the X direction and the change $\Delta Y$ in the Y direction based on the latest touch position recorded in the SDRAM 219 and the current touch position on the touch screen 215.

The main body controller 223 then determines whether or not an absolute value of the change $\Delta X$ in the X direction is larger than an absolute value of the change $\Delta Y$ in the Y direction (step S210). When the main body controller 223 determines that the absolute value of the change $\Delta X$ in the X direction is larger than the absolute value of the change $\Delta Y$ in the Y direction ("Yes" at step S210), the imaging device 1 moves to step S211, which will be explained later. On the other hand, when the main body controller 223 determines that the absolute value of the change ΔX in the X direction is not larger than the absolute value of the change ΔY in the Y direction ("No" at step S210), the imaging device 1 moves to step S216, which will be explained later.

Figure 10:
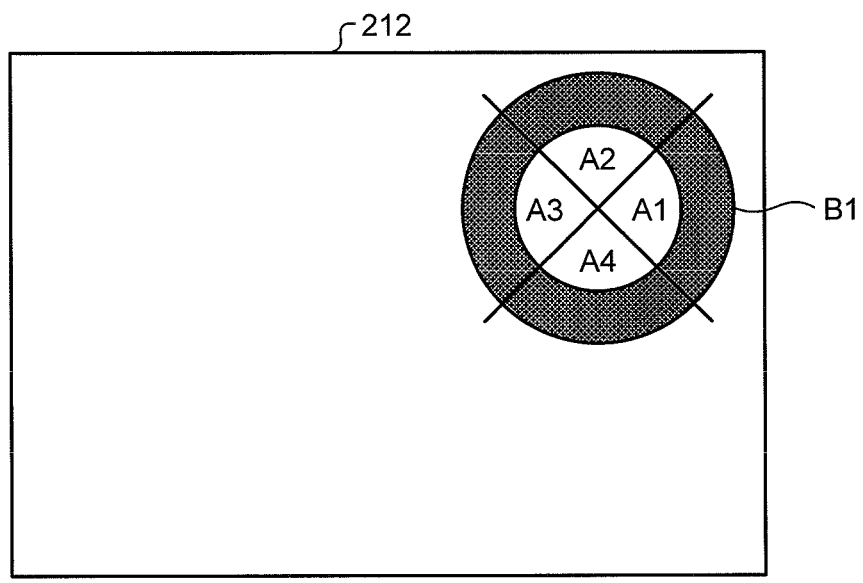
FIG. 10 schematically shows an area where the ring is displayed.

When the change ΔX in the X direction is larger than zero at step S211 ("Yes" at step S211) and the position where the mark M1 is displayed is in an area A2 or an area A4 of the ring B1 ("Yes" at step S212), the display controller 223c shifts the mark M1 rightward along the arc of the ring B1 and controls the eyepiece display unit 212 to display it (step S213). Specifically, when the position where the mark M1 is displayed is in the area A2 or in the area A4, the display controller 223c shifts the mark M1 rightward along the arc of the ring B1 and controls the eyepiece display unit 212 to display it, as shown in FIG. 10. For example, when the eyepiece display unit 212 displays the live view image $W_1$ (FIG. 11A) and the user executes a sliding operation obliquely downward with respect to the touch screen 215 (FIG. 11B→FIG. 11C), the display controller 223c shifts the mark M1 from the area A2 to an area A1 and controls the eyepiece display unit 212 to display it, as shown in FIGS. 11A to 11D. On this occasion, the display controller 223c may control the eyepiece display unit 212 to execute the display while shifting the display position of the mark M1 by 90 degrees.

As explained, since a user is able to virtually operate, by shifting in such a way as to draw a circle with a sliding operation on the touch screen 215, the mark M1 of the ring B1 even if the user is not able to check shooting parameters in the display unit 214 in the state where an eye of the user is kept closely looking at the eyepiece display unit 212 and not able to accurately move the mark M1 along the ring B1 with a finger in contact thereon, it is possible to promptly make changes of desired shooting parameters by an intuitive operation irrespective of the touch position on the touch screen 215. Moreover, it is possible for the user to securely hold the imaging device 1 in the state where an eye of the user is kept closely looking at the eyepiece display unit 212 and to execute a fine adjustment of shooting parameters by a rough operation with a right thumb that can be used freely. While icons I1 to I3 (Art1 to Art3) for special effect items of the special effect processor 207a are taken and explained as examples of the shooting parameters in FIG. 11, items, contents, and positions of the icons regarding the shooting parameters may be changed depending on an operation amount of the sliding operation. Moreover, a state where a shading process is executed as the special effect process is indicated by hatching in a live view image $W_2$ in FIGS. 11C and 11D. After step S213, the imaging device 1 returns to the main routine in FIG. 4.

When the position where the mark M1 is displayed is not in the area A2 or the area A4 of the ring B1 at step S212 ("No" at step S212), the imaging device 1 returns to the main routine in FIG. 4.

When the change ΔX in the X direction is not more than zero at step S211 ("No" at step S211) and the position where the mark M1 is displayed is in the area A2 or the area A4 of the ring B1 ("Yes" at step S214), the display controller 223c shifts the mark M1 leftward along the arc of the ring B1 and controls the eyepiece display unit 212 to execute the display (step S215). After step S215, the imaging device 1 returns to the main routine in FIG. 4.

When the position where the mark M1 is displayed is not in the area A2 or the area A4 at step S214 ("No" at step S214), the imaging device 1 returns to the main routine in FIG. 4.

When the change ΔY in the Y direction is more than zero at step S216 ("Yes" at step S216) and the position where the mark M1 is displayed is in the area A1 or the area A3 of the ring B1 ("Yes" at step S217), the display controller 223c shifts the mark M1 upward along the arc of the ring B1 and controls the eyepiece display unit 212 to execute the display (step S218). After step S218, the imaging device 1 returns the main routine in FIG. 4.

When the position where the mark M1 is displayed is not in the area A1 or the area A3 at step S217 ("No" at step S217), the imaging device 1 returns to the main routine in FIG. 4.

When the change ΔY in the Y direction is not more than zero at step S216 ("No" at step S216) and the position where the mark M1 is displayed is in the area A1 or the area A3 of the ring B1 ("Yes" at step S219), the display controller 223c shifts the mark M1 downward along the arc of the ring B1 and controls the eyepiece display unit 212 to execute the display (step S220). After step S220, the imaging device 1 returns the main routine in FIG. 4.

When the position where the mark M1 is displayed is not in the area A1 or the area A3 at step S219 ("No" at step S219), the imaging device 1 returns to the main routine in FIG. 4.

When the touch onto the touch screen 215 is continued by the user at step S207 ("Yes" at step S207) and the touch position does not change ("No" at step S208), the imaging device 1 returns to the main routine in FIG. 4.

When the touch onto the touch screen 215 is not continued by the user at step S207 ("No" at step S207), the main body controller 223 executes a touch position initialization in which positional information regarding the touch position recorded in the SDRAM 219 is reset (step S221).

The display controller 223c then ends the display of the ring B1 and the mark M1 on the live view image displayed in the eyepiece display unit 212 (step S222). After step S222, the imaging device 1 returns to the main routine in FIG. 4.

Figure 11A:
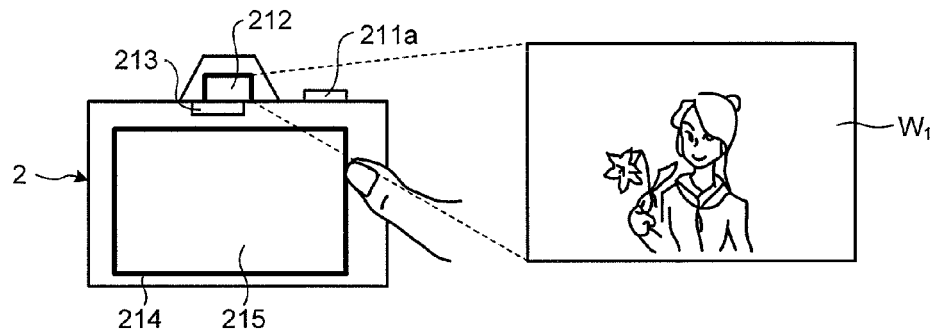
FIG. 11A schematically shows a screen transition of the eyepiece display unit of the imaging device according to the first embodiment of the present invention.
Figure 11B:
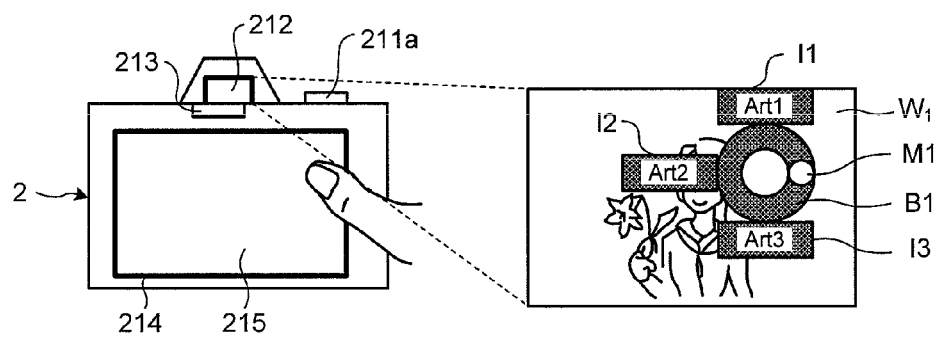
FIG. 11B schematically shows a screen transition of the eyepiece display unit of the imaging device according to the first embodiment of the present invention.
Figure 11C:
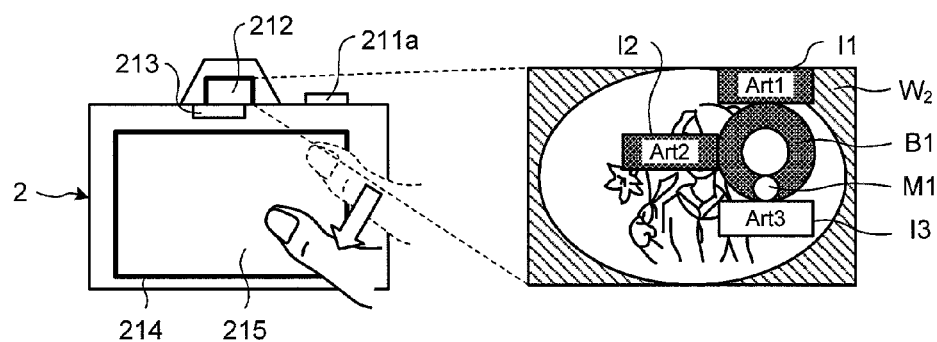
FIG. 11C schematically shows a screen transition of the eyepiece display unit of the imaging device according to the first embodiment of the present invention.
Figure 11D:
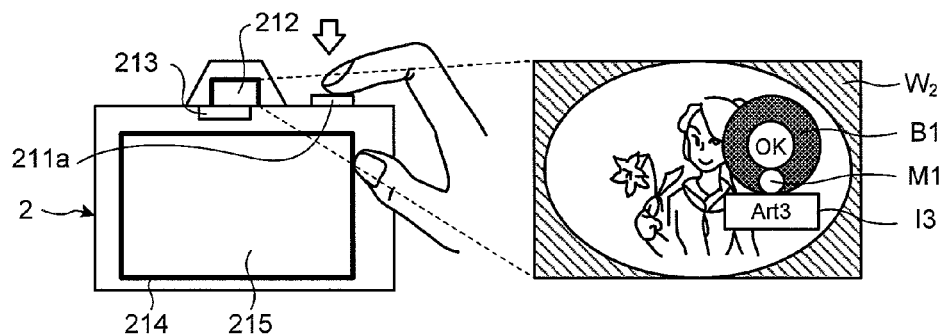
FIG. 11D schematically shows a screen transition of the eyepiece display unit of the imaging device according to the first embodiment of the present invention.

Back to FIG. 4, an explanation from step S104 will be continued. When an item of shooting parameters is selected at step S104 ("Yes" at step S104), the display controller 223c highlights and displays as a candidate in the eyepiece display unit 212 the item corresponding to the position of the mark M1 (step S105). Specifically, the display controller 223c controls the eyepiece display unit 212 to highlight and display the Art3 icon I3 corresponding to the position of the mark M1 as shown in FIG. 11C. It is thus possible for the user to intuitively grasp the selected shooting parameter item. On the other hand, when an item of shooting parameters is not selected ("No" at step S104), the imaging device 1 moves to step S106.

Figure 12A:
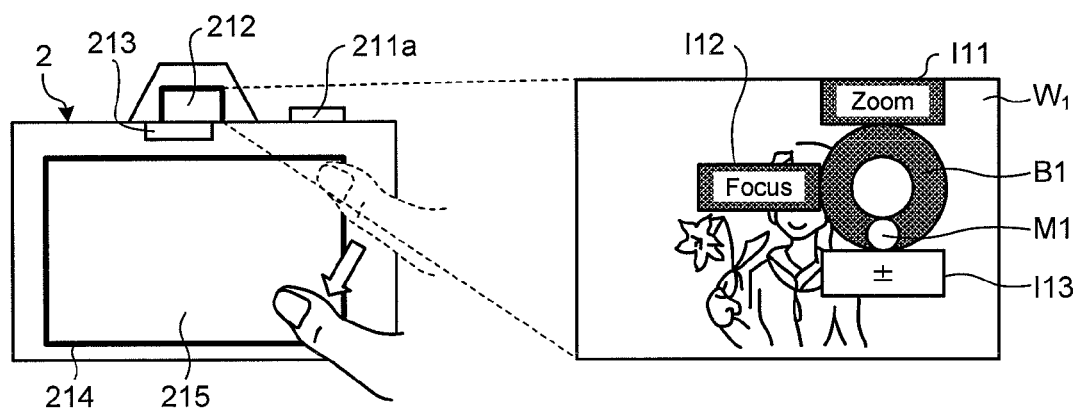
FIG. 12A schematically shows another screen transition of the eyepiece display unit of the imaging device according to the first embodiment of the present invention.
Figure 12B:
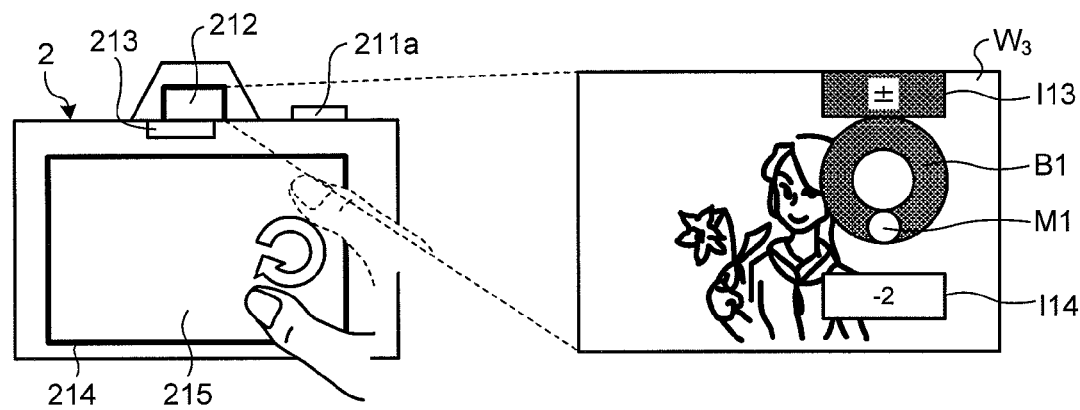
FIG. 12B schematically shows another screen transition of the eyepiece display unit of the imaging device according to the first embodiment of the present invention.

When a numerical value of the selected shooting parameter changes ("Yes" at step S106), the shooting controller 223d then sets as a candidate a numerical value corresponding to the position of the mark (step S107). Specifically, when, among a plurality of shooting parameter items, for example, a zoom icon I11, a focus icon I12, and an exposure icon I13, the exposure icon is set (FIG. 12A) and the eyepiece display unit 212 displays the exposure icon I13 on the live view image $W_1$ as shown in FIGS. 12A and 12B, and when a numerical value of the parameter for the exposure changes in response to the touch operation (−2 icon I14, for example), the shooting controller 223d sets, as a candidate, the numerical value corresponding to the current position of the mark M1. On the other hand, when the numerical value of the selected shooting parameter does not change ("No" at step S106), the imaging device 1 moves to step S108.

After that, when the item and the numerical value of the shooting parameter are determined ("Yes" at step S108), the shooting controller 223d determines the item and the numerical value of the selected shooting parameter and reflects them into control (step S109). Specifically, when a first release signal is input from the release button 211a or when a determination icon (not shown) is selected via the touch screen 215, the shooting controller 223d determines the item and the numerical value of the selected current shooting parameter and reflects them into control of the imaging device 1. For example, when the selected shooting parameter is the exposure item and the numerical value is "−2", the shooting controller 223d sets an exposure value of image data to be shot to "−2". A live view image $W_3$ displayed in the eyepiece display unit 212 thus comes to underexposure as shown in FIG. 12B. On the other hand, when the item and the numerical value of the shooting parameter are not determined ("No" at step S108), the imaging device 1 moves to step S110.

Subsequently, when a second release signal is input from the release button 211a and a still image shooting is to be executed ("Yes" at step S110), the shooting controller 223d drives the shutter driver 202 to execute a still image shooting by a mechanical shutter (step S111). After step S111, the imaging device 1 moves to step S112. On the other hand, when a second release is not input from the release button 211a and a still image shooting is not to be executed ("No" at step S110), the imaging device 1 moves to step S112.

After that, when the moving image button 211b is operated ("Yes" at step S112), the shooting controller 223d starts a moving image shooting in which image data generated continuously by the imaging element 203 is recorded in the recording medium 217 along the chronological order (step S113). After step S113, the imaging device 1 moves to step S114. On the other hand, when the moving image button 211b is not operated ("No" at step S112), the imaging device 1 moves to step S114.

When the moving image button 211b is operated and an instruction signal for ending the moving image shooting is input ("Yes" at step S114), the shooting controller 223d then ends the moving image shooting (step S115). After step S115, the imaging device 1 moves to step S116. On the other hand, when the instruction signal for ending the moving image shooting is not input ("No" at step S114), the imaging device 1 moves to step S116.

After that, when the power source button 211f is operated and the power of the imaging device 1 is turned off ("Yes" at step S116), the imaging device 1 ends the process. On the other hand, when the power of the imaging device 1 is not turned off ("No" at step S116), the imaging device 1 moves to step S101.

When a shooting mode is not set at step S101 ("No" at step S101) and a reproduction mode is set in the imaging device 1 ("Yes" at step S117), the display controller 223c controls the display unit 214 to display a list of files of image data recorded in the recording medium 217 (step S118).

Subsequently, when a file is selected, via the touch screen 215, from the list of files displayed in the display unit 214 ("Yes" at step S119), the display controller 223c controls the display unit 214 to reproduce the selected file (step S120).

After that, when an instruction signal of ending the file reproduction is input from the operation input unit 211 ("Yes" at step S121), the imaging device 1 returns to step S118. On the other hand, when the instruction signal of ending the file reproduction is not input from the operation input unit 211 ("No" at step S121), the imaging device 1 returns step S120.

When a file is not selected via the touch screen 215 from the list of files displayed in the display unit 214 at step S119 ("No" at step S119), the imaging device 1 moves to step S122.

Subsequently, when an instruction signal of instructing an end of the reproduction mode is input from the operation input unit 211 ("Yes" at step S122), the imaging device 1 moves to step S116. On the other hand, when the instruction signal of instructing an end of the reproduction mode is not input from the operation input unit 211 ("No" step S122), the imaging device 1 returns to step S118.

When the reproduction mode is not set in the imaging device 1 at step S117 ("No" at step S117), the imaging device 1 moves to step S116.

According to the first embodiment of the present invention explained above, it is possible to make a prompt change of a desired shooting parameter by an intuitive operation since the mark M1 of the ring B1 can be shifted virtually by shifting the position of the sliding operation in the horizontal direction and the vertical direction on the touch screen 215 even if the mark M1 with a finger in contact thereon cannot be accurately moved along the ring B1 in the state where an eye is kept closely looking at the eyepiece display unit 212.

Second Embodiment

Next, a second embodiment of the present invention will be explained. An imaging device according to a second embodiment has the same configuration as the imaging device according to the first embodiment and has a difference in touch ring conversion displaying process. Therefore, a touch ring conversion displaying process executed by the imaging device according to the second embodiment will be explained below. Here, the same component of the imaging device according to the first embodiment will be assigned with the same reference symbol in the explanation.

Figure 13:
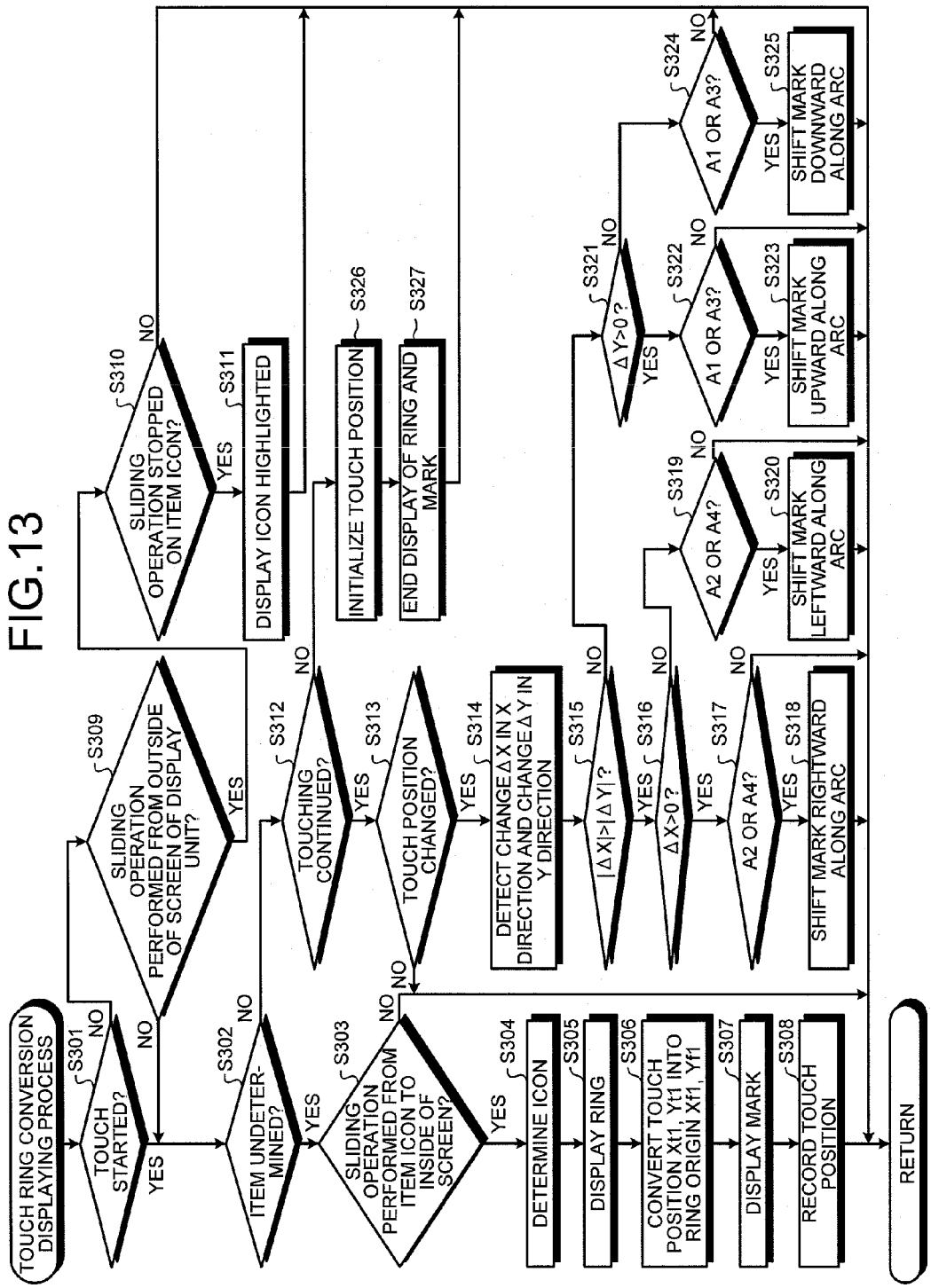
FIG. 13 is a flowchart of an outline of a touch ring conversion displaying process according to a second embodiment of the present invention.

FIG. 13 is a flowchart of an outline of a touch ring conversion displaying process executed by the imaging device 1 according to the second embodiment.

Figure 14A:
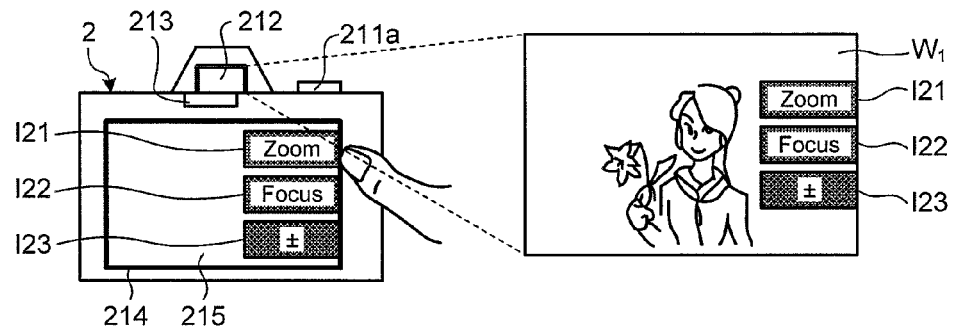
FIG. 14A schematically shows a screen transition of an eyepiece display unit of an imaging device according to the second embodiment of the present invention.
Figure 14B:
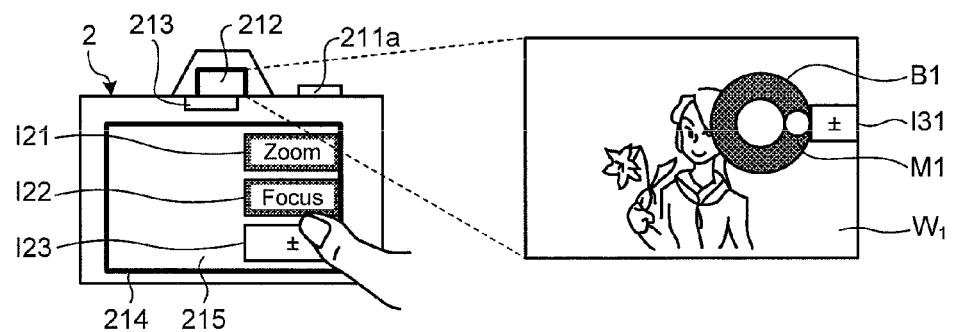
FIG. 14B schematically shows a screen transition of the eyepiece display unit of the imaging device according to the second embodiment of the present invention.
Figure 14C:
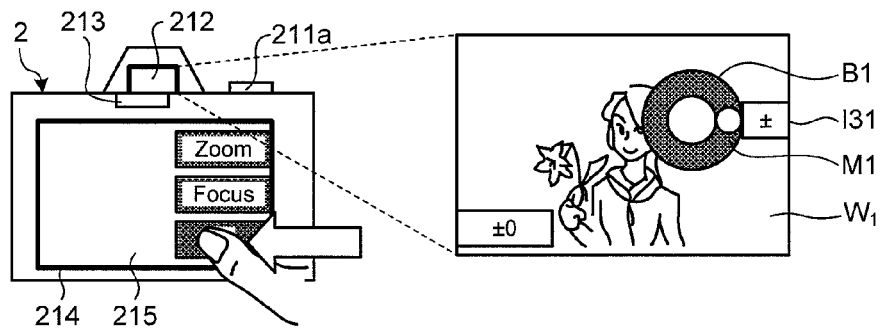
FIG. 14C schematically shows a screen transition of the eyepiece display unit of the imaging device according to the second embodiment of the present invention.

As shown in FIG. 13, when a touch onto the touch screen 215 is started ("Yes" at step S301) and a shooting parameter item in the imaging device 1 is undetermined ("Yes" at step S302), the main body controller 223 determines whether or not a sliding operation with respect to any of icons of shooting parameter items is executed toward an inside of the screen (step S303). Specifically, the main body controller 223 determines whether or not a sliding operation is executed to the inside of the screen with respect to a display area for an exposure icon I23 among a zoom icon I21, a focus icon I22, and the exposure icon I23 displayed in the display unit 214 as shown in FIGS. 14A to 14D (FIG. 14A→FIG. 14B→FIG. 14C). When the main body controller 223 determines that a sliding operation is executed to the inside of the screen with respect to any of the icons for the shooting parameter items ("Yes" at step S303), the imaging device 1 moves to step S304. On the other hand, when the main body controller 223 determines that a sliding operation is not executed to the inside of the screen with respect to any of the icons for the shooting parameter items ("No" at step S303), the imaging device 1 returns to the main routine in FIG. 4.

Figure 14D:
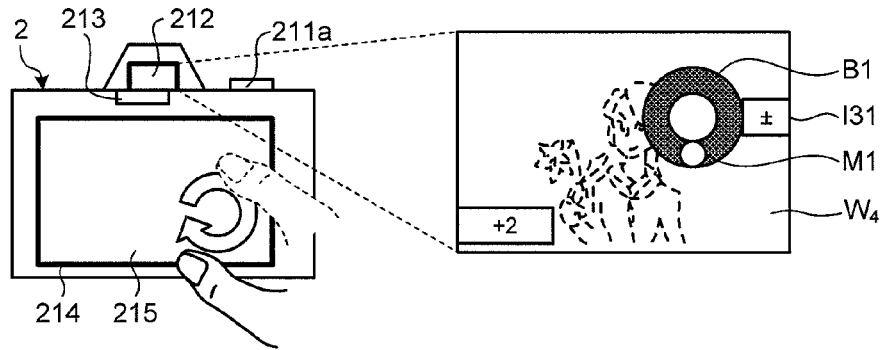
FIG. 14D schematically shows a screen transition of the eyepiece display unit of the imaging device according to the second embodiment of the present invention.

At step S304, the shooting controller 223d determines, as an item whose shooting parameter is to be changed, an item corresponding to the icon on which the sliding operation is executed. For example, when a sliding operation is executed on the exposure icon I23, the main body controller 223 determines, for a shooting parameter, a change of an exposure value as shown in FIGS. 14C and 14D (FIG. 14C→FIG. 14D).

Steps S305 to S308 correspond to steps S202 to S205 in FIG. 7. After step S308, the imaging device 1 returns to the main routine in FIG. 4.

When a touch onto the touch screen 215 is not started at step S301 ("No" at step S301) and the touch detector 223a detects a sliding operation from an outside of the screen of the display unit 214 ("Yes" at step S309), the imaging device 1 moves to step S310.

Subsequently, when the sliding operation is stopped on an icon for a shooting parameter item ("Yes" at step S310), the display controller 223c controls the display unit 214 to highlight and display the icon where the sliding operation is stopped (step S311). After step S311, the imaging device 1 returns to the main routine in FIG. 4.

When the sliding operation is not stopped on an icon for a shooting parameter item at step S310 ("No" at step S310), the imaging device 1 returns to the main routine in FIG. 4.

When a touch onto the touch screen 215 is not started at step S301 ("No" at step S301) and the touch detector 223a does not detect a sliding operation from the outside of the screen of the display unit 214 ("No" at step S309), the imaging device 1 moves to step S302.

When a shooting parameter item is not undetermined at step S302 ("No" at step S302), the imaging device 1 moves to step S312.

Steps S312 to S327 correspond to steps S207 to S221 in FIG. 7. Here, when an exposure icon is set for a shooting parameter item as shown in FIG. 14D, the shooting controller 223d changes an exposure value depending on the touch operation.

According to the second embodiment of the present invention explained above, it is possible to change, after selecting a shooting parameter item displayed in the display unit 214, the content and the numerical value of the selected shooting parameter item by touching, without looking at the display unit 214, while an eye is placed close to the eyepiece display unit 212.

Third Embodiment

Next, a third embodiment of the present invention will be explained. An imaging device according to a third embodiment has the same configuration as the imaging device according to the first embodiment and has a difference in touch ring conversion displaying process. Therefore, a touch ring conversion displaying process executed by the imaging device according to the second embodiment will be explained below. Here, the same component of the imaging device 1 according to the first embodiment will be assigned with the same reference symbol in the explanation.

Figure 15:
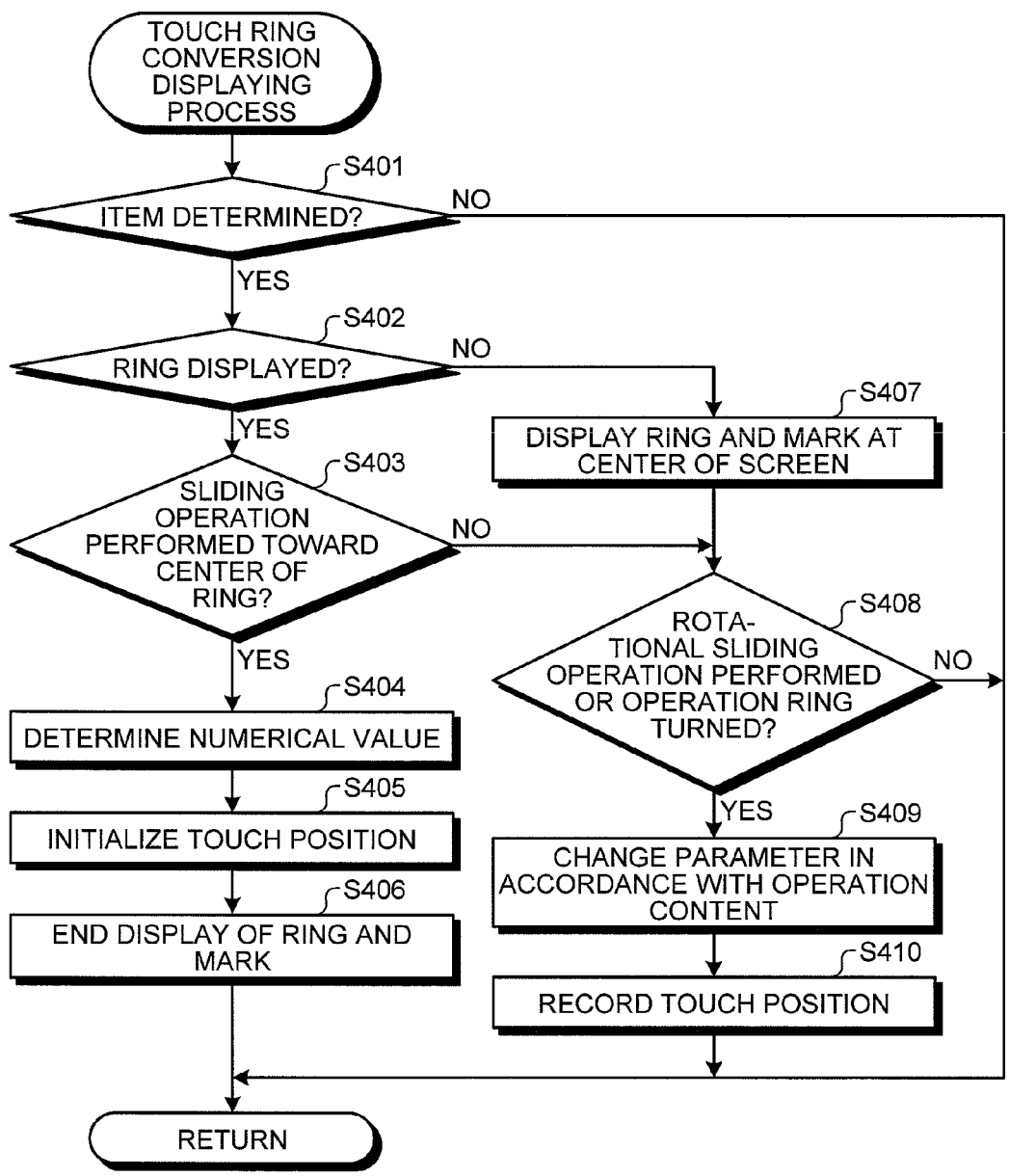
FIG. 15 is a flowchart of an outline of a touch ring conversion displaying process according to a third embodiment of the present invention.

FIG. 15 is a flowchart of an outline of a touch ring conversion displaying process executed by an imaging device 1 according to the third embodiment.

As shown in FIG. 15, the main body controller 223 determines whether or not a shooting parameter item is determined yet (step S401). When the main body controller 223 determines that a shooting parameter item is determined ("Yes" at step S401), the imaging device 1 moves to step S402, which will be explained later. On the other hand, when the main body controller 223 determines that a shooting parameter item is not determined ("No" at step S401), the imaging device 1 returns to the main routine in FIG. 4.

Figure 16A:
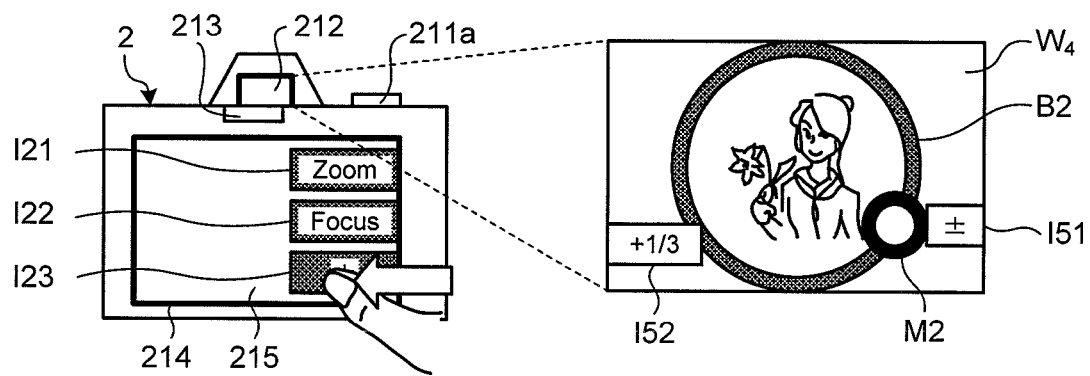
FIG. 16A schematically shows a screen transition of an eyepiece display unit of an imaging device according to the third embodiment of the present invention.
Figure 16B:
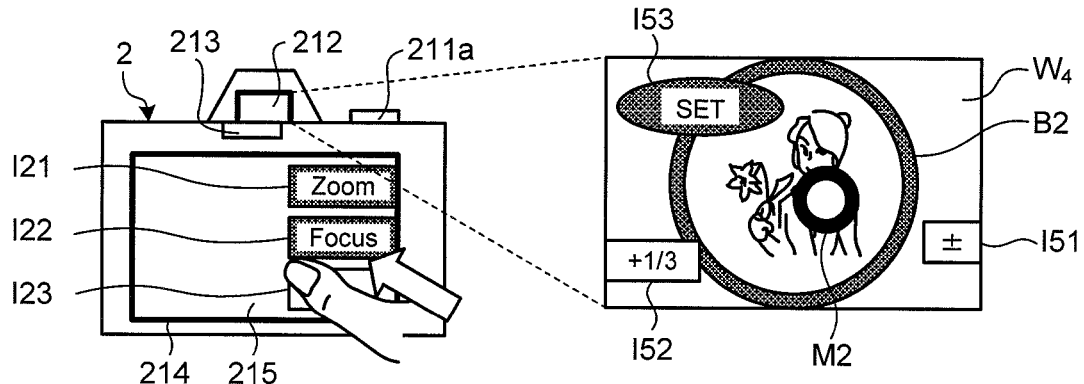
FIG. 16B schematically shows a screen transition of the eyepiece display unit of the imaging device according to the third embodiment of the present invention.

When the ring in which a plurality of operation contents of the imaging device 1 are arranged at predetermined intervals as operational information is already displayed in the display unit 214 at step S402 ("Yes" at step S402) and a sliding operation is executed toward the center of the ring ("Yes" at step S403), the shooting controller 223d determines, as a shooting parameter of the imaging device 1, the current numerical value of the shooting parameter item displayed in the display unit 214 (step S404). Specifically, when the eyepiece display unit 212 displays a ring B2 on a live view image $W_4$ and a sliding operation is executed toward the center of the ring B2, the shooting controller 223d determines the current parameter, for example, an exposure value "+⅓", displayed in the display unit 214 as shown in FIGS. 16A and 16B (FIG. 16A→FIG. 16B).

Subsequently, the shooting controller 223d initializes the touch position information recorded in the SDRAM 219.

After that, the display controller 223c controls the display unit 214 to end the display of the ring B2 and a mark M2 on the ring B2 (step S406). After step S406, the imaging device 1 returns the main routine in FIG. 4.

When the ring B2 is not displayed yet in the display unit 214 at step S402 ("No" at step S402), the display controller 223c controls the display unit 214 to display the ring B2 and the mark M2 at a center of the screen (step S407).

When a rotational sliding operation is executed with respect to the ring B2 or when an operation ring 305a of the lens operation unit 305 is turned ("Yes" at step S408), the shooting controller 223d then changes a shooting parameter in accordance with the operation content (step S409).

After that, the shooting controller 223d records a touch position determined by the touch detector 223a in the SDRAM 219 (step S410). After step S410, the imaging device 1 returns to the main routine in FIG. 4.

When a sliding operation is not executed toward the center of the ring B2 at step S403 ("No" at step S403), the imaging device 1 moves to step S408.

When a rotational sliding operation is not executed with respect to the ring B2 or when the operation ring 305a of the lens operation unit 305 is not turned ("No" at step S408), the imaging device 1 returns to the main routine in FIG. 4.

When a shooting parameter item is not determined yet at S401 ("No" at step S401), the imaging device 1 returns to the main routine in FIG. 4.

According to the third embodiment of the present invention explained above, it is possible to promptly change a shooting parameter by an intuitive operation since shooting parameters of the imaging device 1 can be set or changed via the operation ring 305a of the lens operation unit 305 or via the touch screen 215 in the state where an eye is kept closely looking at the eyepiece display unit 212.

Besides, one shooting parameter, for example, a parameter for exposure may be allotted to the lens operation unit 305 and a plurality of shooting parameter items may be allotted to the touch screen 215 in the third embodiment of the present invention. In this case, it is possible for the user to change or set easily two shooting parameters at the same time in the state where an eye is kept closely looking at the eyepiece display unit 212.

In addition, it is also possible to change shooting parameters by touching or executing a sliding operation on a shooting parameter item displayed on a live view image by the display unit 214 in the third embodiment of the present invention.

Figure 17A:
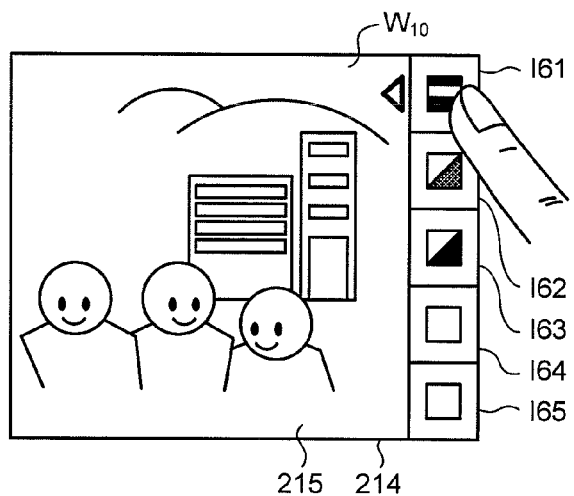
FIG. 17A schematically shows a screen transition of a display unit of an imaging device according to a modification of the third embodiment of the present invention.
Figure 17B:
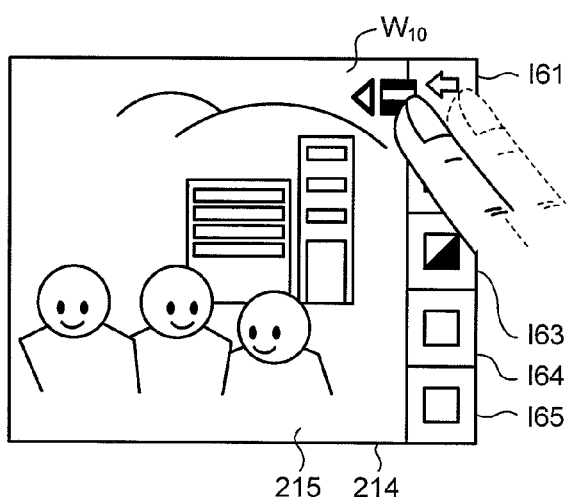
FIG. 17B schematically shows a screen transition of the display unit of the imaging device according to the modification of the third embodiment of the present invention.
Figure 17C:
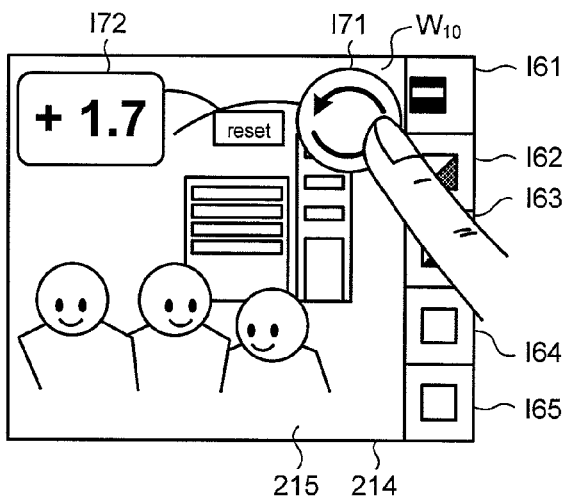
FIG. 17C schematically shows a screen transition of the display unit of the imaging device according to the modification of the third embodiment of the present invention.

FIGS. 17A to 17C schematically show a brief summary in changing a shooting parameter by a sliding operation with respect to a shooting parameter item displayed on a live view image by the display unit 214. As shown in FIG. 17, in a case where the display unit 214 displays a plurality of icons I61 to I65 regarding shooting parameters on a live view image $W_{10}$ (FIG. 17A), the display controller 223c controls the display unit 214 to display a ring B3 that enables changing a numerical value of a shooting parameter corresponding to an icon I71 (FIG. 17C) when the user executes a sliding operation from the right side to the left side of the screen with respect to a desired icon, for example, the icon I61 via the touch screen 215 (FIG. 17A→FIG. 17B).

After that, the user changes the numeral value of the shooting parameter by touching on and shifting at intervals the ring B3 via the touch screen 215 in such a way as to draw a circle. On this occasion, the display controller 223c controls the display unit 214 to display an icon I72 that indicates the numeral value of the shooting parameter for the icon I71 depending on the change (track) at intervals in positional signals input from the touch screen 215. Hence, it is possible for the user to promptly change the numerical value of a desired shooting parameter item by an intuitive operation.

Other Embodiments

Figure 18A:
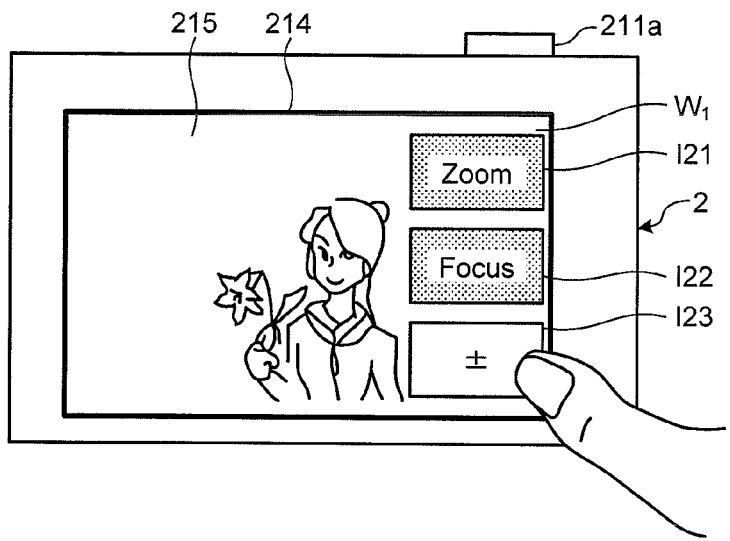
FIG. 18A schematically shows a screen transition of a display unit of an imaging device according to another embodiment of the present invention.
Figure 18B:
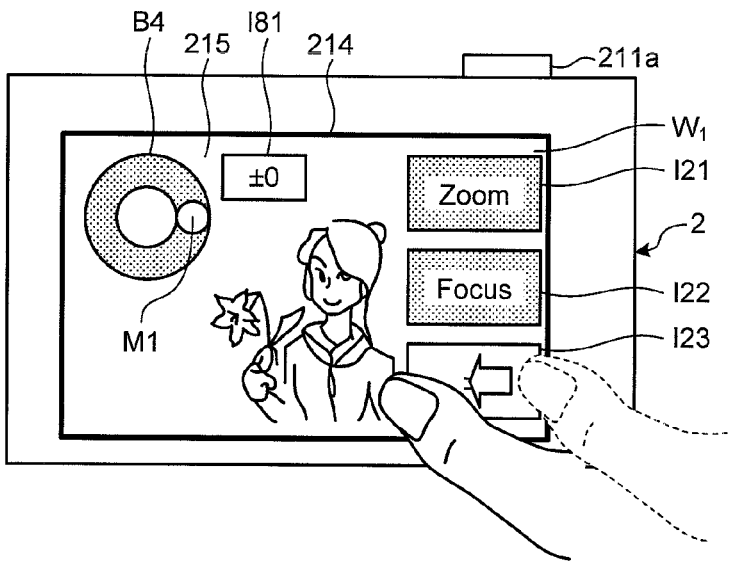
FIG. 18B schematically shows a screen transition of the display unit of the imaging device according to another embodiment of the present invention.
Figure 18C:
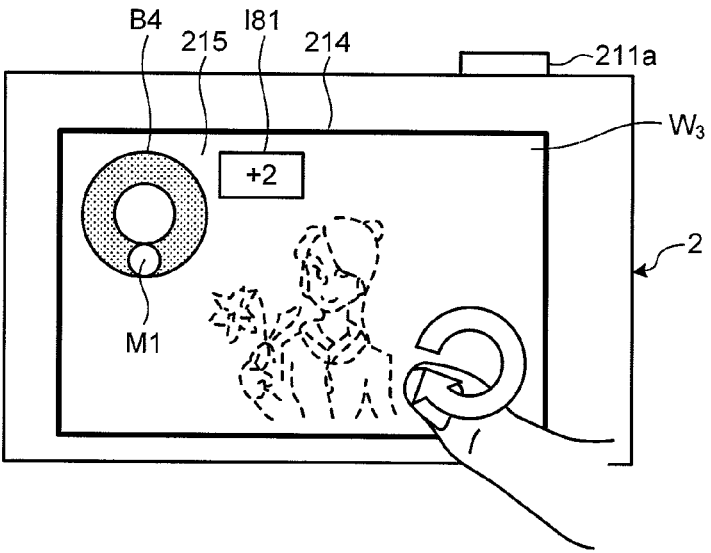
FIG. 18C schematically shows a screen transition of the display unit of the imaging device according to another embodiment of the present invention.

While embodiments of the present invention are explained so far, the present invention is not limited to the three embodiments. For example, the present invention is applicable to a configuration without the eyepiece display unit 212 as shown in FIGS. 18A to 18C. In this case, when a sliding operation is executed from the right side to the left side with respect to any one of the zoom icon I21, the focus icon I22, and the exposure icon I23, for example, the exposure icon I23 (FIG. 18A→FIG. 18B), the display controller 223c controls the display unit 214 to display, by superimposing, a ring B4 that enables changing a parameter for exposure on the live view image $W_1$. After that, when the user executes a sliding operation at intervals on the touch screen 215 in such a way as to draw a circle (FIG. 18C), the shooting controller 223d changes a value of the parameter for exposure depending on a track of positional signals input from the touch screen 215. It is thus possible for the user to make a prompt change of the numerical value and the shooting parameter item by an intuitive operation without a touch operation on the ring B4.

While the eyepiece display unit is integrally formed with the main body unit in the present invention, it may be detachably attached to the main body unit.

While the eyepiece display unit is an electronic view finder in the present invention, a hybrid view finder constituted by an optical view finder and an electronic view finder may be applied.

A display panel such as a liquid crystal, an organic EL, and the like provided in an optical view finder may be applied in the present invention. In this case, a rotational pathway may be displayed on the display panel.

Besides, the main body unit and the lens unit may be integrally formed in the present invention.

While the touch screen 215 is integrally formed with the main body unit in the present invention, it may be provided as an accessory and detachably attached to the main body unit.

Moreover, the electronic device according to the present invention may be applied to, other than imaging devices like digital single lens reflex cameras, various electronic devices including: digital cameras and digital video cameras, which are able to be equipped with accessories; and mobile phones and tablet portable devices, which have shooting functions.

Furthermore, the electronic device according to the present invention may also be applied to a medical device. In a case where an operation is executed while an operator observes a diseased site of a subject by a display monitor in a medical device such as a medical robot that enables an operation on a subject by a remote manipulation, a manipulation parameter of the medical device may be changed by executing a sliding operation on a touch screen provided at a position different from the display monitor in such a way as to draw a circle if the operation parameter, for example, a brightness provided by an illumination of the medical device cannot be adjusted.

While expressions like "first", "after that", "then", and the like are used to show a context of processes among steps in the explanation for flowcharts in the description of the present invention, the sequence of processes necessary for carrying out the present invention will not be defined uniquely by those expressions. That is to say, the sequence of the processes in the flowcharts shown in the description of the present invention can be changed in a scope with consistency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device capable of operating according to an operation signal that is input, comprising:
   a display unit capable of displaying a rotational pathway on a screen, with which an operation of the electronic device is associated according to a position on the rotational pathway;
   a touch screen that detects a touch from an outside and receives an input of a positional signal according to a position of the touch; and
   a main body controller including a touch detector that detects the position of the touch depending on the position signal input from the touch screen, a display controller that converts the position of the touch corresponding to the positional signal received by the touch screen into a position on the rotational pathway and causes a mark to be displayed at the position converted, and an operation controller that controls an operation of the electronic device according to a display position of the mark on the rotational pathway,
   wherein the display controller causes the mark to be displayed at an initial position on the rotational pathway that is a position originally touched on the touch screen, and determines a size of the rotational pathway on the display unit depending on a size of a display area of the display unit, and
   when the position of the touch is changed, the touch detector detects a change in an X direction and a change in a Y direction based on the positional signal input from the touch screen, the main body controller compares an absolute value of the change in the X direction with an absolute value of the change in the Y direction, and the display controller causes the mark to be displayed based on a comparison result between the absolute value of the change in the X direction and the absolute value of the change in the Y direction.

2. The electronic device according to claim 1, further comprising:
   an operation input unit that receives an input of a determination signal that determines an operation of the electronic device, wherein
   the operation controller executes an operation of the electronic device, the operation corresponding to a display position of the mark at a time point when the determination signal is input from the operation input unit.

3. The electronic device according to claim 1, wherein the rotational pathway is circular-ring-shaped.

4. The electronic device according to claim 1, wherein the display unit is an eyepiece type finder.

5. The electronic device according to claim 1, further comprising:
   a rear surface display unit that is provided at a rear surface of the electronic device and capable of displaying an image, wherein
   the touch screen is provided being superimposed on a display screen of the rear surface display unit.

6. The electronic device according to claim 1, wherein the display controller causes the display unit to display the mark while shifting the mark per 90 degrees.

7. The electronic device according to claim 1, further comprising:
an imaging unit that captures an image of a subject and generates image data of the subject, wherein
the display unit displays an image corresponding to the image data generated by the imaging unit.

8. The electronic device according to claim 7, wherein operations of the electronic device correspond to shooting parameters related to shooting.

9. The electronic device according to claim 8, further comprising:
an image processor that executes image processing on the image data, wherein
the shooting parameters include exposure information, brightness information, zoom magnification information, focus position information, ISO sensitivity information, aperture information, shutter speed information, process information of image processing by the image processor, and shooting mode information related to a shooting mode.

10. The electronic device according to claim 1, further comprising:
a lens unit that internally retains a plurality of optical elements, condenses light from a predetermined view field area, and includes a lens operation unit that receives an input of an instruction signal related to an operation of the electronic device, wherein
the display controller causes a display position of the mark on the rotational pathway to be shifted when the instruction signal is input from the lens operation unit.

11. The electronic device according to claim 1, wherein the display unit is provided separately from the touch screen.

12. The electronic device according to claim 1, wherein a size of the display unit is smaller than a size of the touch screen.

13. The electronic device according to claim 12, wherein the display unit is an eyepiece type view finder and has no touch function.

14. A driving method executed by an electronic device comprising a touch screen that detects a touch from an outside and receives an input of a positional signal corresponding to a position of the touch, the electronic device being capable of operating according to an operation signal that is input, the driving method comprising:
starting display of a rotational pathway on a screen and with which an operation of the electronic device is associated according to a position on the rotational pathway, wherein a size of the rotational pathway on the screen is determined depending on a size of a display area of the screen;
detecting the position of the touch depending on the position signal corresponding to the position of the touch input from the touch screen;
converting the position of the touch corresponding to the positional signal received by the touch screen into a position on the rotational pathway;
causing the mark to be displayed at an initial position on the rotational pathway that is a position originally touched on the touch screen, and
responsive to the position of the touch being changed, further
(1) detecting a change in an X direction and a change in a Y direction based on the positional signal input from the touch screen,
(2) comparing an absolute value of the change in the X direction with an absolute value of the change in the Y direction, and
(3) causing the mark to be displayed based on a comparison result between the absolute value of the change in the X direction and the absolute value of the change in the Y direction; and
controlling an operation of the electronic device according to a display position of the mark on the rotational pathway when a determination signal that determines the display position of the mark is input.

15. A non-transitory computer readable recording medium with an executable computer program recorded therein, the computer program instructing a processor, which is included in an electronic device comprising a touch screen that detects a touch from an outside, receives an input of a positional signal corresponding to a position of the touch, and is capable of operating according to an operation signal that is input, to execute:
starting display of a rotational pathway on a screen and with which an operation of the electronic device is associated according to a position on the rotational pathway, wherein a size of the rotational pathway on the screen is determined depending on a size of a display area of the screen;
detecting the position of the touch depending on the position signal corresponding to the position of the touch input from the touch screen;
converting the position of the touch corresponding to the positional signal received by the touch screen into a position on the rotational pathway;
causing the mark to be displayed at an initial position on the rotational pathway that is a position originally touched on the touch screen, and
responsive to the position of the touch being changed, further
(1) detecting a change in an X direction and a change in a Y direction based on the positional signal input from the touch screen,
(2) comparing an absolute value of the change in the X direction with an absolute value of the change in the Y direction, and
(3) causing the mark to be displayed based on a comparison result between the absolute value of the change in the X direction and the absolute value of the change in the Y direction; and
controlling an operation of the electronic device according to a display position of the mark on the rotational pathway when a determination signal that determines the display position of the mark is input.

* * * * *